United States Patent [19]

Esparza

[11] Patent Number: 4,688,966
[45] Date of Patent: Aug. 25, 1987

[54] REDUCED J TUBE PULL FORCE

[75] Inventor: Joe O. Esparza, Katy, Tex.

[73] Assignee: Shell Oil Company, Houston, Tex.

[21] Appl. No.: 866,658

[22] Filed: May 27, 1986

[51] Int. Cl.[4] .............................................. F16L 1/04
[52] U.S. Cl. ..................................... 405/168; 72/166;
166/343; 166/367; 405/195; 405/169
[58] Field of Search ............... 405/195, 168, 169, 170,
405/184; 166/345, 343, 341, 350, 359, 367;
72/166, 167, 41, 462; 175/9, 61

[56] References Cited

U.S. PATENT DOCUMENTS

| | | | |
|---|---|---|---|
| 1,515,894 | 11/1924 | Taylor | 72/166 X |
| 3,293,897 | 12/1966 | Holter | 72/166 X |
| 3,434,296 | 3/1969 | Otterman et al. | 166/343 X |
| 3,595,312 | 7/1971 | Matthews | 405/168 X |
| 3,650,114 | 3/1972 | Neal | 405/169 X |
| 3,680,342 | 8/1972 | Mott et al. | 72/166 X |
| 3,955,599 | 5/1976 | Walker | 405/169 X |
| 4,095,437 | 6/1978 | Cox | 405/169 X |
| 4,098,091 | 7/1978 | Desai et al. | 405/195 X |
| 4,403,890 | 9/1983 | Miyanagi et al. | 405/184 |

Primary Examiner—Dennis L. Taylor

[57] ABSTRACT

A method and apparatus are provided for reducing the force required to move a pipe through a J-tube riser attached to an offshore platform. The J-tube riser is provided with at least one movable section and the movable section is oscillated as the pipe is moved through the J-tube riser, thereby reducing the force required to move the pipe.

12 Claims, 2 Drawing Figures

REDUCED J TUBE PULL FORCE

BACKGROUND OF THE INVENTION

This invention pertains to the use of J-tubes on offshore platforms for installing pipelines extending upwardly from the seafloor.

In offshore petroleum operations, a platform frequently serves as an operational base and a production terminal for oil and gas wells. A problem common to all such offsore platforms is providing a connection from an above water facility to a pipeline which lies on the seafloor. A typical method of providing the connection is the use of a J-tube riser guide member which is a continuous tubular structure having the shape of a J and through which a riser pipeline is pulled from the seafloor to the above-water facility. This J-tube runs down along the length of the platform, bends near the seafloor and thus runs generally parallel to the seafloor a short distance. The lower end of the J-tube frequently includes a flared portion referred to as a bell mouth. The upwardly pulled pipeline, i.e. the riser, provides a fluid flow path from the above-water facility to the pipeline on the seafloor.

At least two basic methods are known for installing the pipeline riser in the J-tube once the J-tube is positioned. In the so-called J-tube method, the pipeline riser is inserted in the seafloor end of the tube and pulled through it with a cable or other means. In the so-called reverse J-tube method, a section of the pipeline riser is inserted in the deck end of the J-tube and is pulled or pushed down through it as additional sections of conduit are joined to the pipeline riser at the deck. Both of these methods place tension on the riser as it is forced through the J-tube. This tension may cause displacements of the pipeline riser and J-tube which produce stresses that exceed the limits of the materials and cause damage to the pipeline riser or J-tube.

Unfortunately, the J-tube is generally useful for riser pipeline diameters only up to about 12 inches. For riser pipelines having a diameter greater than 12 inches, the high pulling force required to install the pipeline riser is a major deterrent to further use of the J-tube. The J-tube riser has the advantage of a controlled and simple installation process which does not require elaborate pipeline manipulating equipment, unlike other known installation processes.

Accordingly, it is a purposes of the present invention to provide a J-tube which has all the advantages of the conventional J-tube and which can be utilized with pipeline diameters greater than 12 inches without placing undue stresses upon the pipeline or the J-tube. Other purposes, advantages and features of the invention will be apparent to one skilled in the art upon review of the following disclosure.

This application is relevant to the following copending applications: application Ser. No. 868,485 filed May 30, 1986, application Ser. No. 876,153 filed June 19, 1986 and application Ser. No. 876,152 filed June 19, 1986.

Applicant is not aware of any prior art references which, in his judgment as one skilled in the pipeline art, would anticipate or render obvious the novel J-tube of the instant invention; however, for the purposes of developing the background of the invention and establishing the state of the requisite art, the following are set forth: U.S. Pat. Nos. 4,098,091 and 4,523,877.

SUMMARY OF THE INVENTION

The present invention provides a J-tube through which a pipeline can be moved by a reduced force.

Accordingly, the present invention provides a method and apparatus for reducing the force required to move a pipe through a J-tube attached to an offshore platform, comprising providing the J-tube with at least one movable section and oscillating the movable section as the pipe is moved through the J-tube. The movable section may be either hinged to the J-tube, or joined to the J-tube by telescoping joint having a loose-enough fit to permit movement of the movable section. Preferably, the movable section is oscillated with means such as an hydraulic jack.

DESCRIPTION OF PREFERRED EMBODIMENTS

In accordance with the present invention a solution is provided to a significant problem which exists on offshore platforms when a pipe is pulled via a J-tube to the top of the platform for a final tie-in. Friction and pull forces exerted are tremendous. Accordingly, the present invention is directed to the need which arises to reduce such forces, thus enabling the pulling of larger diameter pipes. Primarily, the present invention is directed to the modification of the existing conventional J-tube. A section of the J-tube riser may be hinged at one or several locations giving it a type of knee action movement that is externally actuated with a hydraulic jack or counterweight means of the like. As the pipe in one embodiment is fed into the J-tube at the bottom and pulled via a cable from the top of the platform, the knee action movement is actuated and the J-tube acts as a bender, nibbler, and come-along, all in one. The movable sections of the J-tube apply lateral bending forces to the riser pipe being pulled into the J-tube which significantly reduces longitudinal pull force. Thus, the invention realizes reduced pull force during installation and reduced residual stress in riser pipe and conduit during operational lifetime.

Figure 1:
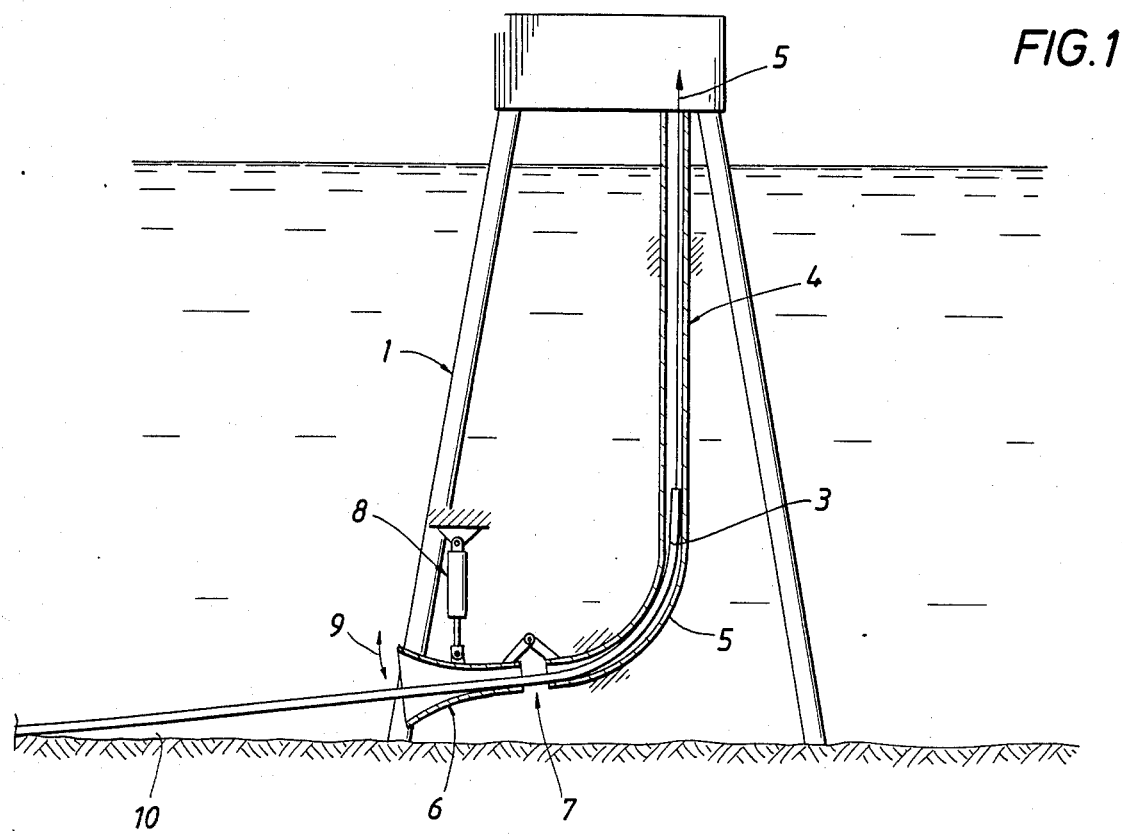
FIG. 1 provides a view of a J-tube having a knee action movable section.

Having thus generally described one embodiment of the invention, the following more particularly describes this and another embodiment of the invention in connection with the accompanying drawings. In FIG. 1 a knee action J-tube is provided to accomplish the benefits of the invention. An offshore platform 1 is provided with a J-tube 4 fixed to the platform. Within the J-tube 4 is a riser pipe 3 having an attached pull cable at the upper end of which is applied a pull force 5. A movable section 6 is connected at the lower end of the J-tube by means of a hinge 7, although other attached means can be provided which will make the lower section movable. A hydraulic jack 8 is employed to give the movable section 6 a cyclic vertical motion 9, as the pipeline 10 passes into the movable section 6.

Figure 2:
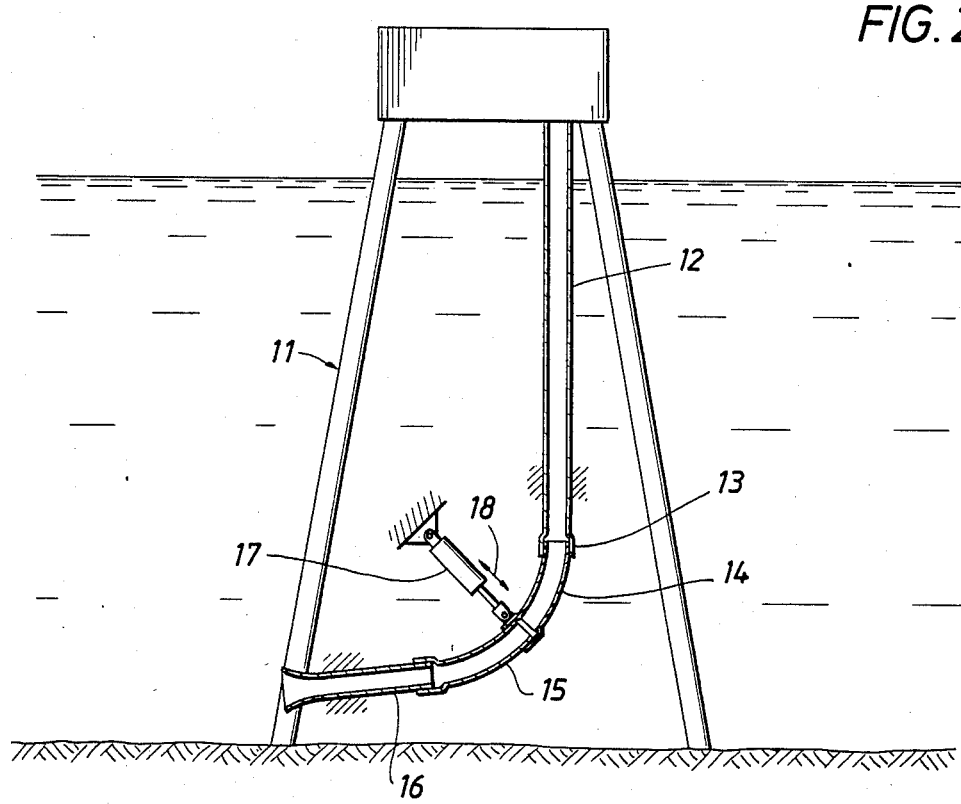
FIG. 2 provides a view of a J-tube having a double action movable section.

In FIG. 2 of the drawings another embodiment of the invention is disclosed which involves a double action. Thus, an offshore platform 11 is provided with a vertical section 12 of J-tube fixed to the platform, a telescoping joint 13, typically in three places, which telescopes with a movable section 14 which in turn telescopes with a movable section 15, which finally connects to a section 16 which is also preferably fixed to the platform. One or more of the sections is connected to some means such as a hydraulic jack 17, preferably actuated from above water which produces cyclic motions of sections 14 and 15. In this drawing, a pipeline would be passing from the seafloor into the J-tube riser but is not shown for purposes of clarity.

The foregoing description of the invention is merely intended to be explanatory thereof. Various changes in the details of the described method and apparatus may be made within the scope of the appended claims without departing from the spirit of the invention. For example, combinations of knee action and double action may be employed in the same J-tube, and the pipe may be pulled or pushed, or both pulled and pushed, through the J-tube from the top and/or bottom.

What is claimed is:

1. A method for reducing the force required to move a pipe through a J-tube attached to an offshore platform, comprising:
   constructing the J-tube of longitudinally connected sections, at least one of the sections being movable with respect to another section; and
   oscillating the movable section as the pipe is moved through the J-tube, thereby reducing friction between the movable section and the pipe.

2. The method of claim 1 including hinging the movable section to another section of the J-tube.

3. The method of claim 1 including telescoping a joint of the movable section to another section of the J-tube.

4. The method of claim 1 including oscillating the movable section with an hydraulic jack.

5. An apparatus for reducing the force required to move a pipe through a J-tube attached to an offshore platform, comprising:
   longitudinally connected sections forming the J-tube, at least one of the sections being movable with respect to another section; and
   means for oscillating the movable section as the pipe is moved through the J-tube to reduce the friction between the movable section and the pipe.

6. The apparatus of claim 5 wherein the movable section is hinged to another section of the J-tube.

7. The apparatus of claim 5 wherein another section of the J-tube and the movable section have telescoping joints.

8. The apparatus of claim 5 including a hydraulic jack for oscillating the movable section.

9. The method of claim 1 including locating the movable section at the lower end of the J-tube.

10. The method of claim 1 wherein the movable section connects a laterally extending section of the J-tube with an upwardly extending section of the J-tube.

11. The apparatus of claim 5 wherein the movable section is located at the lower end of the J-tube.

12. The apparatus of claim 5 wherein the movable section connects a laterally extending section of the J-tube with an upwardly extending section of the J-tube.

* * * * *